United States Patent [19]
Cole et al.

[11] Patent Number: 5,558,045
[45] Date of Patent: Sep. 24, 1996

[54] REFRACTORY TILE FOR OPEN-SPACED BOILER TUBES

[75] Inventors: Arthur W. Cole, Rowley, Mass.; John M. Heffernan, Langhorne, Pa.

[73] Assignees: Wheelabrator Environmental Systems, Inc., Hampton, N.H.; The Carborundum Company, Niagara Falls, N.Y.

[21] Appl. No.: 305,638

[22] Filed: Sep. 14, 1994

[51] Int. Cl.$^6$ .................................................... F22B 37/00
[52] U.S. Cl. ............................................ 122/6 A; 432/234
[58] Field of Search ............................. 110/6 A, 510, 110/235.11; 432/234

[56] References Cited

U.S. PATENT DOCUMENTS

| | | | |
|---|---|---|---|
| 1,719,642 | 7/1929 | Bailey . | |
| 3,797,416 | 3/1974 | Lawson . | |
| 3,828,735 | 8/1974 | Graham et al. . | |
| 3,838,665 | 10/1974 | Astrom | 122/6 A |
| 3,850,146 | 11/1974 | Graham et al. | 122/6 A |
| 3,914,100 | 10/1975 | Guskea . | |
| 4,071,311 | 1/1978 | Errington . | |
| 4,080,152 | 3/1978 | Alifeld et al. | 432/234 |
| 4,140,484 | 2/1979 | Payne | 432/234 |
| 4,682,568 | 7/1987 | Green et al. . | |
| 4,773,356 | 9/1988 | Black | 122/6 A |
| 4,809,645 | 3/1989 | Fournier et al. . | |
| 4,900,248 | 2/1990 | Terai et al. | 432/234 |
| 5,136,610 | 8/1992 | Heuss | 432/234 |
| 5,154,139 | 10/1992 | Johnson | 122/510 |
| 5,181,319 | 1/1993 | Campbell | 432/234 |
| 5,243,801 | 9/1993 | Aiken et al. . | |

*Primary Examiner*—Marguerite McMahon
*Attorney, Agent, or Firm*—Bean, Kauffman & Spencer

[57] ABSTRACT

A refractory tile adapted for protecting boiler tubes from the corrosive and erosive effects of a hot gas stream comprises an elongated ceramic body covering only that side of a boiler tube upon which the hot gas impinges. The tile is hung on the tube with a threaded stud anchored on the tube and a nut threaded on the stud, urging the tile against the tube.

9 Claims, 2 Drawing Sheets

REFRACTORY TILE FOR OPEN-SPACED BOILER TUBES

This invention is in the field of refractory shield materials, especially ceramic refractories for protecting water-containing boiler tubing from the corrosive and erosive effects of a hot gas stream in a furnace.

BACKGROUND

It is standard practice to protect the water or steam-carrying boiler tubes in a commercial furnace with refractory materials. In many cases such boiler tubing is disposed in closely spaced arrays, and these arrays can be protected with a substantially monolithic wall of refractory tile.

Bailey, U.S. Pat. No. 1,719,642, discloses tile for use in such an array of closely spaced tubing Metal-backed, ceramic-faced tiles are hung from bolts anchored between the tubes. The tubing array is covered with a substantially monolithic wall of tile completely encircling the tubing.

Lawson, U.S. Pat. No. 3,797,416, describes boiler tube protection for powdered coal-fired boilers. A substantially monolithic protective wall with tongue and groove connections between the protective parts completely encircles the tubing.

Graham, et al., U.S. Pat. No. 3,828,735, discloses a substantially monolithic wall of tile to protect a closely-spaced boiler tube array. The tiles are hung from T-shaped anchors between the tubes.

Fournier, et al., U.S. Pat. No. 4,809,645, discloses a closely-spaced boiler tube array covered with a substantially monolithic wall of individual refractory tiles held against the tubing by means of fins projecting from the tubing.

Aiken, et al., U.S. Pat. No. 5,243,801, describes a substantially monolithic refractory tile wall to be hung on a closely-spaced array of boiler tubing by means of T-shaped anchors affixed between the tubes.

Whereas closely spaced boiler tubes in a furnace can be protected economically with a substantially monolithic wall of refractory tile, when the boiler tubes are spaced a greater distance apart it may not be economically feasible to provide a complete wall of protection. Rather, it may be more desirable to protect each water tube individually. This situation arises in several different contexts.

For example, Guskea, U.S. Pat. No. 3,914,100, describes protective ceramic tile for spaced apart water tubes in a steel mill reheat furnace. A pair of hollowed ceramic tiles interlock along their longitudinal edges to completely encircle the tubing.

Also, Errington, U.S. Pat. No. 4,071,311, discloses refractory sheathing for horizontal water pipes in a steel mill reheat furnace; the sheathing consists of two layers which completely surround the tubing, a fibrous layer overlaid with refractory tile.

Finally, Green, et al., U.S. Pat. No. 4,682,568, describes ceramic tile for protecting individual spaced superheater tubes. The shielding includes two interlocking semicylindrical refractory shapes which completely encircle the steam tube. The interlock between the halves of the tile requires that they be slid together about the tube by relative motion parallel to the tubing and, thus, that the tubing be accessible from all sides for initial installation or replacement. These conditions cannot always be met. To replace a single cracked or otherwise damaged tile, many of the tile on the tube must be removed to slide the damaged piece off.

SUMMARY OF THE INVENTION

This invention is directed to the spaced apart array of steam tubes found in the superheater section of a furnace. The invention is especially useful in a mass-fired municipal-refuse incinerator. Under the operating conditions found in such facilities, the overhead superheater section of the furnace is subjected to a high velocity hot air stream which contains both particulate and gaseous components that rapidly corrode and erode the steam tubing. Because of the desirability of efficient heat transfer from the hot gas to the tubing and because of the relatively wide spacing of the tubing perpendicular to the gas stream, it is not economically feasible to protect the superheater tubing with a complete refractory tile wall.

Thus, it is one object of this invention to provide refractory tile adapted for protecting open-spaced boiler tubing against corrosion/erosion. It is another objective of this invention to provide refractory tile which are readily installed, removed from the tubing, and replaced. It is yet another objective of this invention to provide refractory tile which are light in weight and economical to use.

In attaining these objectives it has been found that, contrary to the teachings of the prior art, refractory tile of this invention are effective in protecting the tubing even though only that side of the tubing facing the hot gas stream is covered. As a consequence, not only is the heat transfer from the hot gas to the tubing enhanced, the overall cost of protecting the superheater is reduced, because less ceramic material is required. Furthermore, the protective tile is lighter in weight than the tile of the prior art and so does not require as much reinforcement of the tubing to support the tile.

Accordingly, the refractory tile of this invention includes a ceramic body elongated along the tubing and having a front face directed toward the hot gas stream and a back face contoured to contact no more than about one-half the tubing surface. A ceramic shield, which can be a part of the ceramic body or a separately molded article, projects from the front face of the ceramic body toward the incoming gas stream.

A cavity is provided in the ceramic body and shield extending from the back face of the ceramic body through the front face of the shield. The cavity is elongated at the back face and enlarged toward the front face of the shield in a step. Tiles are hung on the tubing from threaded studs anchored thereon by fitting the tile to the tubing, passing the stud into the cavity and threading a nut onto the stud. Contact between the nut and the shoulder created by the step-wise enlargement of the cavity urges the tile against the tubing.

In a preferred embodiment, a ceramic plug is fitted to the cavity at the front face of the shield, providing enhanced protection to the anchoring mechanism.

The manner and means by which the refractory tile of this invention can be made and used will be clarified by reference to the drawings which accompany this specification and to the Detailed Description which follows.

DETAILED DESCRIPTION

Figure 4:
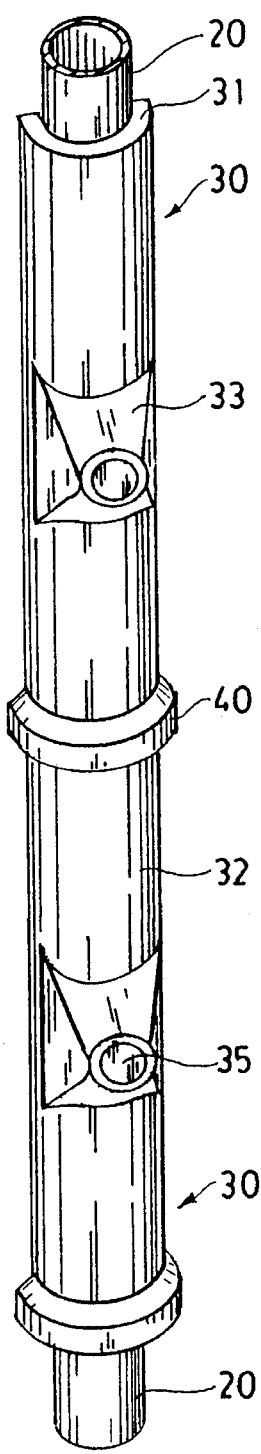
FIG. 4 is an isometric view showing the relationship between two refractory tiles of this invention on a single piece of tubing.

With reference now to the Figures, boiler tube 20 carries protective tile 30, which is hung on one side of the tube. Tile 30 includes ceramic body 38 and shield 33. In an especially useful application, tube 20 will be a steam tube in the superheater section of a mass-fired municipal-waste incinerator, and the tile will be hung on that side of the tube facing the hot gas stream. In this application the hot gas stream will impinge upon front face 32 of the tile. In general, another tile 30 will be hung on the adjacent section of the same tube, as shown in FIG. 4.

Figure 5:
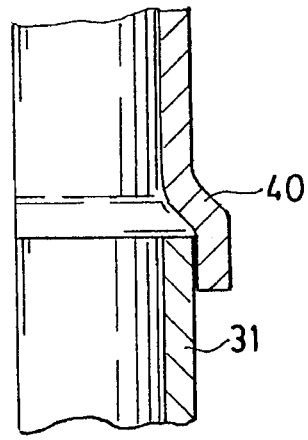
FIG. 5 is a fragmentary view in section showing a preferred joint between two tiles of this invention on a steam tube.

The joints between adjacent tiles can be of several different types, and the utility of the invention is not very dependent upon the type of joint selected. For example, butt to butt joints, optionally with refractory cement between the tiles, can be employed, as can other variations. Another type of joint, a shiplap joint, is illustrated in the Figures and is preferred. As most clearly shown in FIG. 5, in a shiplap joint, the butt end 31 of one tile is held beneath collar 40 of the adjacent tile.

Figure 1:
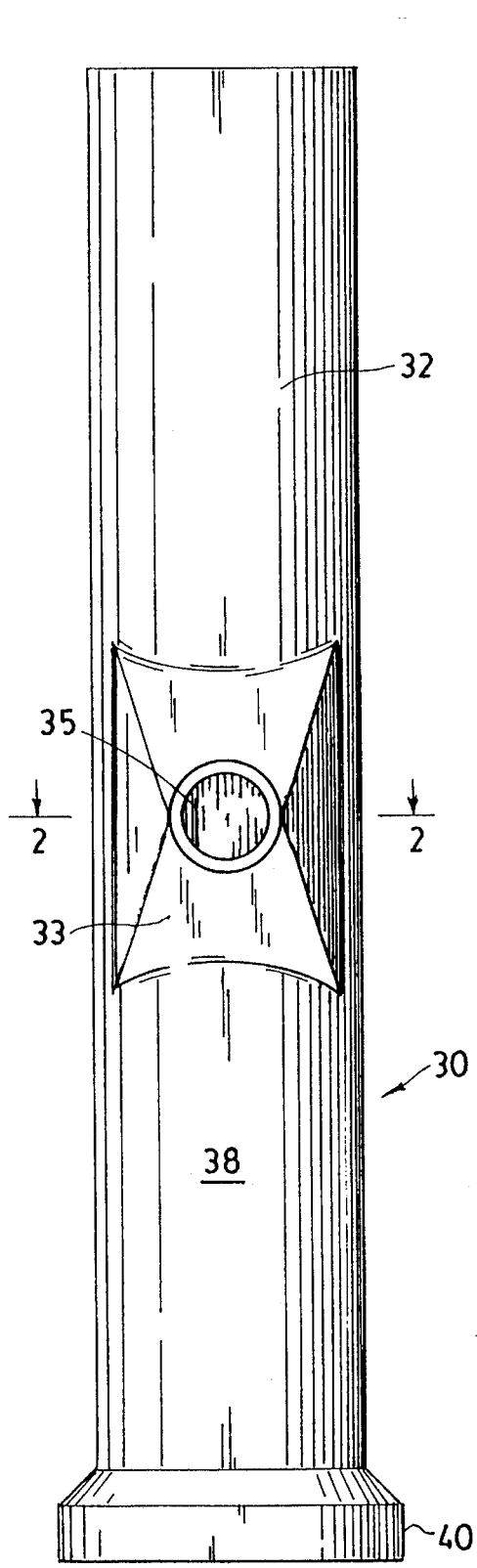
FIG. 1 is a front view of the refractory tile of this invention.
Figure 3:
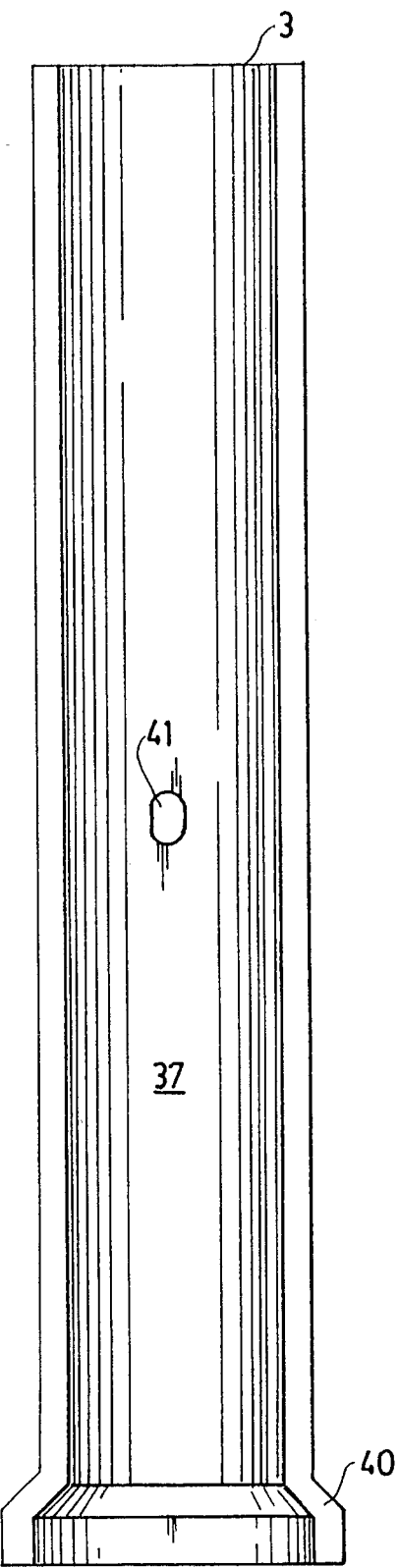
FIG. 3 is a view from the back of the refractory tile of FIG. 1.
Figure 2:
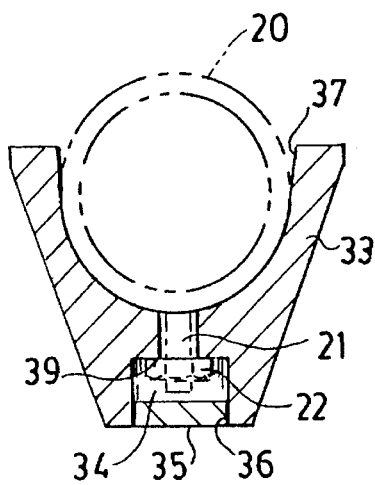
FIG. 2 is a sectional view taken along line 2—2 of FIG. 1 and also including, in phantom line, a boiler tube and tile attachment mechanism.

Front face 32 of the tile carries shield 33, which can be an integral part of the tile, or it can be produced separately and joined to ceramic body 38 at the time the tile is affixed to the tubing. With reference now to FIGS. 2 and 3, it will be observed the back face 37 of tile 30 contacts no more than about one-half the boiler tube surface, i.e., the tile touches no more than about one-half the tubing circumference. The remainder of the tube, that portion opposite the impinging hot gas stream, is open. Thus, expensive refractory material is conserved, and the weight and cost of the tile are reduced correspondingly.

Cavity 34 is provided, beginning with entrance 41 and extending from the back face 37 of the ceramic body 38 through the front face of shield 33. The cavity is enlarged stepwise toward the front face of the shield, producing shoulder 39. The cavity can be molded into the ceramic body and shield at the time of manufacture. The longitudinal elongation of entrance 41 permits some longitudinal adjustability of the tile with respect to the means for anchoring the tile on tube 20 and provides for thermal expansion.

Cavity 34 is sized back to front to pass threaded stud 21. Stud 21 can be made of stainless steel and can be anchored to boiler tube 20 by welding or other appropriate means. Tile can be affixed to the tube by first fitting the tile to the tubing by passing the stud into cavity 34 through entrance 41 and then threading a nut 22 onto the stud to press against shoulder 39, thereby urging the tile against the tube. If the ceramic body and the shield are separate articles, the shield will be placed against the ceramic body and the stud passed through the combination. When applied to the stud, the nut will hold the articles together.

Although not a requirement, it may be desirable and so is preferred that a ceramic plug 35, sized to closely occupy and seal the cavity at the front face of the shield, be inserted. Refractory cement 36 can optionally be employed to enhance the seal, thereby protecting the tile attachment means from corrosion. It will be evident that this added protection ensures that the tile can be readily removed from the tube, if desired, and replaced.

The tile of this invention can be produced from any of a number of different ceramic materials which are available in commerce. For example, a very satisfactory tile can be produced from REFRAX® 20 silicon nitride-bonded silicon carbide, which is available from The Carborundum Company, Niagara Falls, N.Y.

It is not intended that the invention be confined to that specifically exemplified in this specification; the scope of the invention is limited only by the following claims.

We claim:

1. A refractory tile adapted for protecting an individual boiler tube against corrosion/erosion from a gas stream comprising
   (a) a unitary semi-cylindrical ceramic body, elongated along the tube and having a front face directed toward the gas stream and a back face contoured in a single smooth curve to contact no more than about one-half of that individual boiler tube surface;
   (b) a ceramic shield projecting toward the gas stream from the front face of that tile; and
   (c) a cavity extending from an entrance on the back face of the ceramic body through the front face of said shield, said cavity being enlarged stepwise toward the front face of said shield, producing a shoulder;
   whereby the tile can be affixed to the tube by means of a threaded stud anchored to that individual boiler tube by fitting the tile to the tube, passing the stud into the cavity, and threading a nut onto the stud to press against the shoulder, thereby urging the tile against the boiler tube.

2. The tile of claim 1 wherein the ceramic body and the shield comprise a single monolithic article.

3. The tile of claim 1 wherein the shield and the ceramic body are separate articles.

4. The tile of claim 1 further comprising a ceramic plug fitted to closely occupy and seal the cavity at the front face of the shield.

5. The tile of claim 1 further comprising a butt end on one end of the elongated body and a collar on another end of the elongated body, whereby two tiles can be mated together end to end by means of a shiplap joint.

6. The tile of claim 1 wherein said entrance is elongated longitudinally.

7. An individual boiler tube protected from gas stream corrosion/erosion by means of a plurality of refractory tile hung in end to end contacting relationship on said individual tube, each of said tile comprising
   (a) a unitary semi-cylindrical ceramic body, elongated along the tube and having a front face directed toward the gas stream and a back face contoured in a single smooth curve to contact no more than about one-half of that individual boiler tube surface;
   (b) a ceramic shield projecting toward the gas stream from the front face of that tile; and
   (c) a cavity extending from an entrance on the back face of the ceramic body through the front face of said shield, said cavity being enlarged stepwise toward the front face of said shield, producing a shoulder;
   whereby each tile can be affixed to the tube by means of a threaded stud anchored to that individual boiler tube by fitting the tile to the tube, passing the stud into the cavity, and threading a nut onto the stud to press against the shoulder, thereby urging the tile against the boiler tube.

8. The protected boiler tube of claim 7 wherein each tile further comprises a butt end on one end of the elongated body and a collar on the other end of the elongated body, whereby two tiles can be mated together end to end by means of a shiplap joint.

9. The protected boiler tube of claim 7 wherein said entrance is elongated longitudinally.

* * * * *